May 6, 1958 G. C. LA PORTE ET AL 2,833,570
SEAL AND DUST GUARD FOR JOURNAL BOX
Filed Feb. 21, 1955

INVENTORS
**GEORGE C. LAPORTE
EDWIN W. TAYLOR
CHARLES H. SPENCE**
BY *Scrivener and Parker*

ATTORNEYS

10 # United States Patent Office 2,833,570
Patented May 6, 1958

2,833,570

SEAL AND DUST GUARD FOR JOURNAL BOX

George C. La Porte, Edwin W. Taylor, and
Charles H. Spence, Baltimore, Md.

Application February 21, 1955, Serial No. 489,546

3 Claims. (Cl. 286—6)

This invention relates to railway car journal boxes and more particularly to an improved dust guard or seal for preventing the access of foreign matter into the interior of the journal box.

The present invention is particularly though not exclusively adapted for use with modern day journal boxes of the type having a bearing chamber into which the usual car wheel axle extends and a vertical slot at the inner end of the box for receiving a dust guard. A journal box of the type referred to and a dust guard therefor are illustrated in the patent to Clyde C. Farmer, No. 2,071,736, issued February 23, 1937. This patent is illustrative of dust guards of the prior art which may be of yieldable material having an annular lip inturned towards the journal box and in sealing engagement with the intermediate diameter of the standard car axle, the material being yieldable to permit the usual axial movement of the axle as the car moves in its normal operation. It is not unusual during such operation for the axle to move sufficiently far in one direction relative to the journal box that the sealing lip of the dust guard extends over the shoulder between the outer smaller diameter journal portion of the axle and the aforesaid intermediate portion. Upon this occurrence the yieldable lip tends to expand radially inwardly about the smaller diameter and when the axle shifts axially in the opposite direction the shoulder gouges into the inner or back side of the lip tearing off pieces thereof and in relatively short time destroying the guard to a point of early replacement.

One object of the present invention is to provide an improved dust guard for journal boxes wherein the above described disadvantages and difficulties are completely eliminated.

A more specific object of the invention is to provide an improved dust guard for journal boxes whose seal about the intermediate portion of the car axle is so constructed and arranged that it cannot drop off the shoulder on to the smaller diameter journal portion irrespective of the degree of normal axial movement of the car axle.

Yet another object of the invention is to provide an improvised dust guard for journal boxes which is adapted for use with standard journal boxes and axles without any changes being required in the basic structure of these members.

Other objects and their attendant advantages will become apparent as the following detailed description is read in conjunction with the accompanying drawings wherein.

Figure 1:
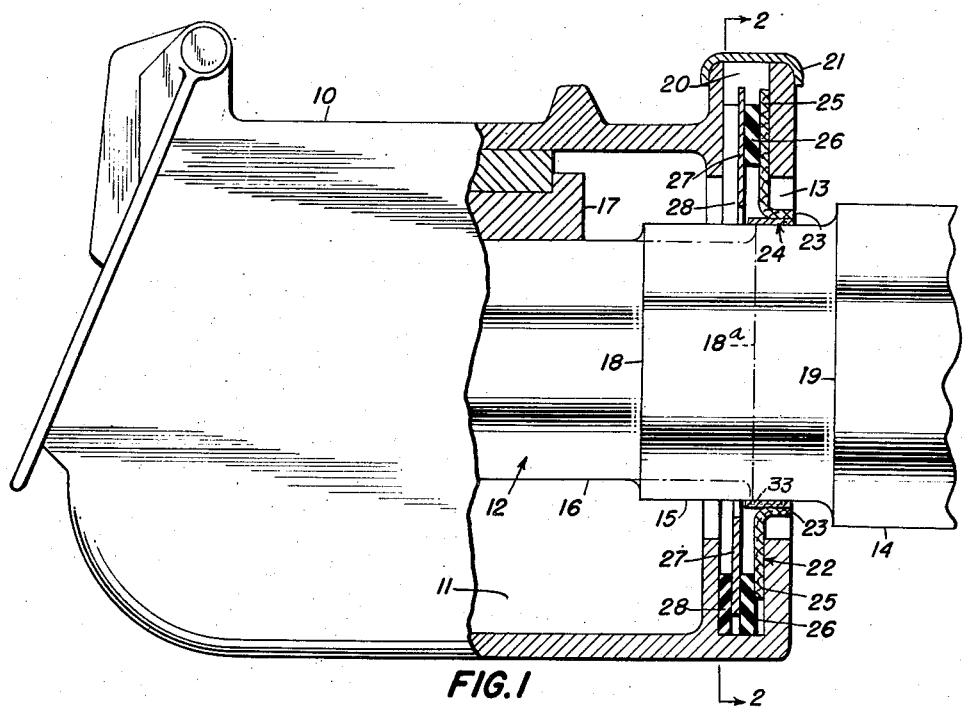
Fig. 1 is an elevational view of a car journal box, partly in section, showing the improved dust guard in position therein.

The improved dust guard of the invention is illustrated as employed with a car journal box of usual construction comprising a casing 10 enclosing a lubricant containing bearing chamber 11 into which the car wheel axle 12 extends through an opening 13 at the inner end of the casing 10. The car axle shown is of usual construction being provided with a large diameter wheel supporting portion 14, an intermediate diameter portion 15 which customarily extends through the opening 13, and a small diameter journal portion 16 which receives the normal half bearing assembly designated generally by the numeral 17. Shoulders 18 and 19 exist between the respective diameters 15, 16, and 17. The rear end of the casing 10 is provided with the usual vertical slot 20 which normally receives some form of dust guard and this slot is customarily closed by a suitable removable cap 21.

What has been described so far is a conventional axle and journal box for railroad cars and as usual in this type of car journal arrangement, the axle 12 and its bearing 17 have a floating relationship with respect to the journal box casing 10 so that the axle has considerable freedom of movement in an axial or lateral direction. Thus a dust guard in slot 20 seated on intermediate portion 15 of axle 12 must be so constructed as to allow this lateral movement while at the same time excluding foreign matter from entering the journal box through the opening 13. Typical dust guards of the prior art have annular sealing flanges or lips which project inwardly towards the interior of the journal box casing. The chief fault with guards of this type has resided in the fact that as the axle shifts to and fro the lip alternately drops over the smaller shoulder 18 on the axle and is relatively quickly destroyed thereby.

The present invention eliminates the aforementioned difficulty in a novel manner and by referring to Fig. 1, it will be seen that in lieu of a sealing lip projecting towards the journal box and in direct sealing engagement with the axle, the present invention provides a flexible sealing member 22 having a lip or flange 23 which projects outwardly from the journal box towards the center line of the car. In addition, instead of bearing directly on the intermediate diameter 15, the lip 23 of member 22 is in sealing engagement with a bearing ring 24, later described in detail, which in turn is in sealing engagement with the intermediate diameter 15 of the axle. A unique feature of this arrangement resides in the fact that when the axle moves sufficiently far to the right in Fig. 1, say to the position shown by the dotted lines 18a, so that the shoulder 18 is beneath the slot 20, the ring 24 overhangs the shoulder and the lip 23, of course, is retained by the ring clear of the shoulder. By projecting the lip away from the shoulder 18 it, and the ring 24, extend towards the car center line beyond the limits of normal axle movement in that direction so that at least a portion of the ring is always seated on the intermediate diameter 15 and thus no portion of the flexible sealing member itself can ever be engaged or mutilated by the shoulder 18 irrespective of its reciprocatory movement.

Figure 2:
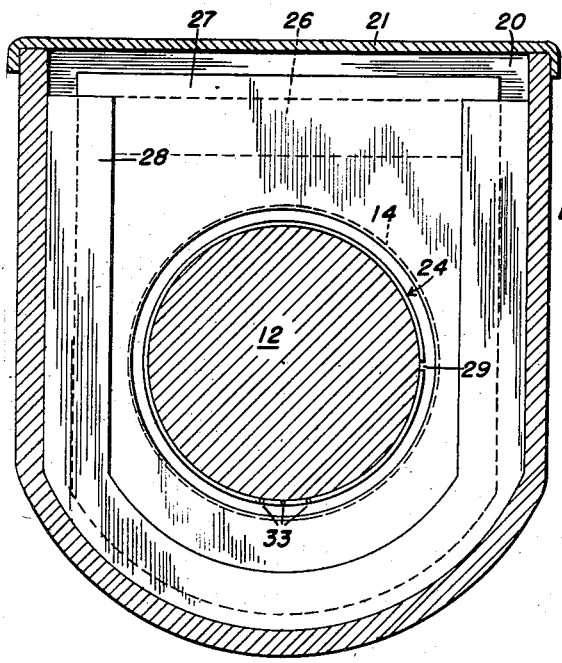
Fig. 2 is a cross-section view taken substantially on the line 2—2 of Fig. 1.

The sealing member 22 is constructed of any suitable flexible material such as leather or the like and the vertical portion 25 thereof is of a size so that when positioned in slot 20 its marginal edges are spaced from the peripheral walls of the slot. The vertical portion 25 of the sealing member 22 provides a fluid tight seal by being compressed against the vertical inner rear wall of the slot 20 by a resilient backing which could be a unitary apertured member of sponge neoprene or like rubbery substance but for ease of assembly is preferably constructed sectionally similar to that illustrated in the drawings wherein the backing is shown comprising a resilient member 26, a metallic plate 27, and a resilient U-shaped member 28. The member 26 is preferably of sponge neoprene or like rubbery material in order to absorb any vertical axle movement and may be bonded directly to the inner face of the sealing member 22. The member 26 is provided with an aperture somewhat larger than the diameter of the axle and has a marginal configuration conforming to the peripheral walls of slot 20 so that when the member 26 is seated therein it serves to prevent the outward passage of lubricating fluid by way of the bottom or sides of the slot 20. The metallic plate 27 has bonded to its inner face the U-shaped member 28 (more clearly shown in Fig. 2) which is also preferably of sponge neoprene or like rubbery material, the metallic plate serving principally as a means for retaining the shape of the U-shaped member 28 and facilitating its insertion into the slot 20. It will be noted from Fig. 2 that plate 27 clears the peripheral walls of slot 20 by a substantial amount in order that it will not strike said walls should the axle be oscillated vertically with respect to the journal box due to rough track. It will also be seen that plate 27 is provided with a central opening which is of greater diameter than the exterior diameter of the bearing ring 24. Due to this construction, the ring 24 may be received in said opening in the event the shoulder 19 of the axle engages the lip 23 of the flexible sealing member 22 and moves said lip and ring toward the left, as viewed in Fig. 1.

Figure 3:
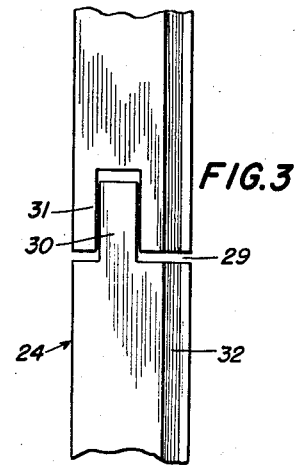
Fig. 3 is an enlarged detail view looking towards the inner surface of a portion of a bearing ring used with the improved dust guard of the present invention.

Referring now to the bearing ring 24, this number is of split construction as shown in Fig. 3 and is provided at the split 29 with a tongue 30 integral with one part of the ring, and a mating slot 31 on the other part in which the tongue slidingly fits. The bearing ring 24 is preferably of spring-like material lined on its inner surface with a bearing metal such as Babbitt or the like and the outer surface of the ring is bonded or otherwise sealingly secured directly to the lip or flange 23 of the sealing member 22. If desired, the inner surface of the ring 24 may include any suitable self-lubricating material, such as graphite or the like. The ring 24 in its unflexed condition is of less diameter than the intermediate portion 15 of the axle 12 so that the ring must be forcibly expanded, and with it the opening provided by lip 23, when the journal box is assembled to the axle. The tendency of the ring to contract causes it to closely engage the axle portion 15, thus aiding in sealing said portion against the passage of oil outwardly or of foreign matter inwardly. In addition, by sealing portion 15 in a stressed condition, as the bearing metal wears away, the ring 24 contracts about axle portion 15 thus being automatically self-adjusting. To further effectively seal the axle against the passage of oil outwardly the ring 24 is provided on its inner surface with one or more annular grooves 32 which trap any oil seeping past the inner side of the ring. The oil that is collected in the grooves runs by gravity to the bottom thereof where it is returned to the journal box through drilled passages 33 located at the bottom of the ring in Fig. 2.

With the axle removed from the journal box, the dust guard of the invention is quite readily assembled. The first members inserted into slot 20 are the sealing member 22 with its attached resilient backing member 26 and with the bearing ring 24 pre-bonded or attached to the lip 23. It should be understood that if the bearing member 24 is pre-bonded its length cannot exceed the width of slot 20. However, it is contemplated that if a longer bearing is desired it could be inserted through opening 13 and then bonded or attached to said lip. After this described assembly has been thus inserted, it is moved to the right in Fig. 1 until the vertical portion 25 of sealing member 22 abuts the inner wall of slot 20 and lip 23, with attached bearing ring 24, projects outwardly through opening 13. Thereafter the metal plate 27 with its attached U-shaped resilient member 28 is forced into the slot 20 and the axle is inserted into the journal box through the ring 24 which is forcibly expanded to a size accommodating the intermediate portion 15. Thereafter the half-bearing assembly 17 is positioned in the normal manner. The dust guard assembly may then be sealed at the upper end of the slot 20 by any well-known solid or thermo-plastic substance (not shown) customarily used in sealing journal boxes by being placed or poured on top of the dust guard assemblage. Thereafter the slot 20 is closed by cap 21 which is secured in place by any suitable means.

The guard of the present invention effectively seals the opening 13 by means of the abutting compressed engagement of the vertical portion 25 of the sealing member 22 against the rear or inner wall of the slot 20. Furthermore, the intermediate portion 15 of the axle is sealed against the passage of matter either inwardly or outwardly of the journal box by the snug engagement of the bearing ring 24 with the intermediate portion 15, said ring, in addition to providing a seal, also being a unique feature in the art of journal box sealing through its ability to prevent deterioration of the dust guard through the reaction of the shoulder 18 on any portion of the flexible sealing member 22. By eliminating this objectionable feature of the prior art, the guard of the present invention materially increases the number of car operating hours that a guard may be used before inspection or replacement. Furthermore, the guard of this invention, even after replacement, is readily restored by reapplication of bearing metal to the ring 24 so that the guard may be repeatedly used for subsequent replacements. It will be apparent, of course, to those skilled in the art that the guard illustrated and described herein is susceptible to many modifications and such modifications are intended to be included within the scope and spirit of the appended claims.

What is claimed is:

1. A dust guard and a seal for a car journal box and an axially movable axle of the type having a seal receiving portion of one diameter, an outer journal portion of lesser diameter, and a shoulder between said diameters, said journal box having a pair of spaced-apart inner and outer parallel vertical walls forming a slot surrounding the axle, and the axle being capable of axial movement relative to the journal box to bring said shoulder to a position substantially in vertical alignment with said inner wall of the slot, said guard and seal comprising a flexible member having a vertical portion positioned within said slot and engaging said inner wall, said vertical portion having a continuous annular lip surrounding said seal receiving portion and extending axially thereof beyond said inner wall and in a direction toward the center line of the car, a bearing ring secured to the inner periphery of said lip and sealingly embracing said first diameter of said axle to form a seal thereabout, said ring extending axially of said axle beyond said inner wall in a direction toward the center line of the car and extending axially of said axle in the opposite direction beyond the vertical portion of said flexible member, and resilient compressive means in said slot and acting on said vertical portion of the flexible member to press said portion into sealing engagement with the inner wall of said slot.

2. A dust guard and a seal for a car journal box and an axially movable axle of the type having a seal receiving portion of one diameter, an outer journal portion of lesser diameter, an inner portion of greater diameter, a shoulder between said seal receiving and journal portions and a second shoulder between said journal and inner portions, said journal box having a pair of spaced-apart inner and outer parallel vertical walls forming a slot surrounding the axle, and the axle being capable of axial movement in one direction relative to the journal box to bring said first named shoulder to a position substantially in vertical alignment with said inner wall of the slot, and the axle being capable of axial movement in the opposite direction to move said second shoulder toward said slot, said guard and seal comprising a plurality of parts separately insertible in said slot prior to assembly of said axle and journal box, one of said parts comprising a flexible member having a vertical portion and an annular lip, said lip having a bearing ring secured to the inner periphery thereof to sealingly embrace said first diameter of said axle, and said one part being insertible in said slot and movable to a position where the vertical portion thereof engages the inner wall of the slot and the lip and ring extend axially of said seal receiving portion in a direction toward the center line of the car and beyond the plane of said inner wall, and said ring extends axially in the opposite direction beyond the vertical portion of said flexible member, another part of said guard and seal including a resilient compressive member insertible in said slot between the outer wall thereof and said first part to press the vertical portion of the flexible member into sealing engagement with the inner wall of the slot, and said other part including a second resilient member, and a metal plate positioned between said resilient members, said plate having an opening the diameter of which is greater than the exterior diameter of said bearing ring.

3. A dust guard and seal as set forth in claim 2 wherein the second resilient member is U-shaped and is bonded to said plate.

References Cited in the file of this patent

UNITED STATES PATENTS

| | | |
|---|---|---|
| 1,989,110 | Penniman | Jan. 29, 1935 |
| 2,151,410 | Richter | Mar. 21, 1939 |
| 2,165,102 | Kimball | July 4, 1939 |
| 2,241,870 | Scribner | May 13, 1941 |
| 2,251,195 | Meunier | July 29, 1941 |
| 2,261,124 | McBride | Nov. 4, 1941 |
| 2,657,080 | Johnson et al. | Oct. 27, 1953 |

FOREIGN PATENTS

| | | |
|---|---|---|
| 69,128 | Germany | June 12, 1893 |